United States Patent
Davies et al.

(10) Patent No.: US 11,267,705 B2
(45) Date of Patent: Mar. 8, 2022

(54) PROCESS FOR REDUCING THE HYDROGEN SULPHIDE CONTENT IN NON-GASEOUS SULPHUR COMPOSITIONS USING A ZINC-BASED SCAVENGER

(71) Applicant: SHELL OIL COMPANY, Houston, TX (US)

(72) Inventors: Helen Jayne Davies, Frodsham (GB); Dawid John D'Melo, Karnataka (IN); Reginald Lambert, Alberta (CA)

(73) Assignee: SHELL OIL COMPANY, Houston, TX (US)

( * ) Notice: Subject to any disclaimer, the term of this patent is extended or adjusted under 35 U.S.C. 154(b) by 540 days.

(21) Appl. No.: 16/319,610

(22) PCT Filed: Jul. 20, 2017

(86) PCT No.: PCT/EP2017/068408
§ 371 (c)(1),
(2) Date: Jan. 22, 2019

(87) PCT Pub. No.: WO2018/015510
PCT Pub. Date: Jan. 25, 2018

(65) Prior Publication Data
US 2021/0284533 A1    Sep. 16, 2021

(30) Foreign Application Priority Data
Jul. 22, 2016   (IN) .............................. 201641025093

(51) Int. Cl.
*C01B 17/02*      (2006.01)
*C01G 9/00*       (2006.01)

(52) U.S. Cl.
CPC ...... *C01B 17/0232* (2013.01); *C01B 17/0243* (2013.01); *C01G 9/00* (2013.01)

(58) Field of Classification Search
CPC ........................... C01B 17/02; C01B 17/0232
See application file for complete search history.

(56) References Cited

U.S. PATENT DOCUMENTS 2,069,710  A    2/1937   Missbach
6,656,445  B2  12/2003   Schield et al.

FOREIGN PATENT DOCUMENTS

WO    2016097378 A1    6/2016

OTHER PUBLICATIONS

International Search Report and Written Opinion received for PCT Patent Application No. PCT/EP2017/068408, dated Oct. 11, 2017, 10 pages.
Amosa et al., "Sulphide Scavengers in Oil and Gas Industry—A Review", NAFTA Scientific Jou., vol. 61, Issue No. 2, Feb. 1, 2010, pp. 85-92, XP009156263.
Lesage et al., "A Field Method for the Determination of Total H2S Content in Commercially Formed Elemental Sulphur", ASRL Quarterly Bulletin, vol. 29, Issue No. 1, 1992, pp. 29-35.

*Primary Examiner* — Timothy C Vanoy
(74) *Attorney, Agent, or Firm* — Shell Oil Company

(57) ABSTRACT

A process for reducing the hydrogen sulphide content in a composition containing or consisting of hydrogen sulphide and non-gaseous elemental sulphur, comprising contacting the composition with a scavenger, wherein the scavenger is chosen from the group consisting of zinc oxide, zinc carbonate, zinc hydroxy carbonate or a combination of two or more of these.

15 Claims, 1 Drawing Sheet

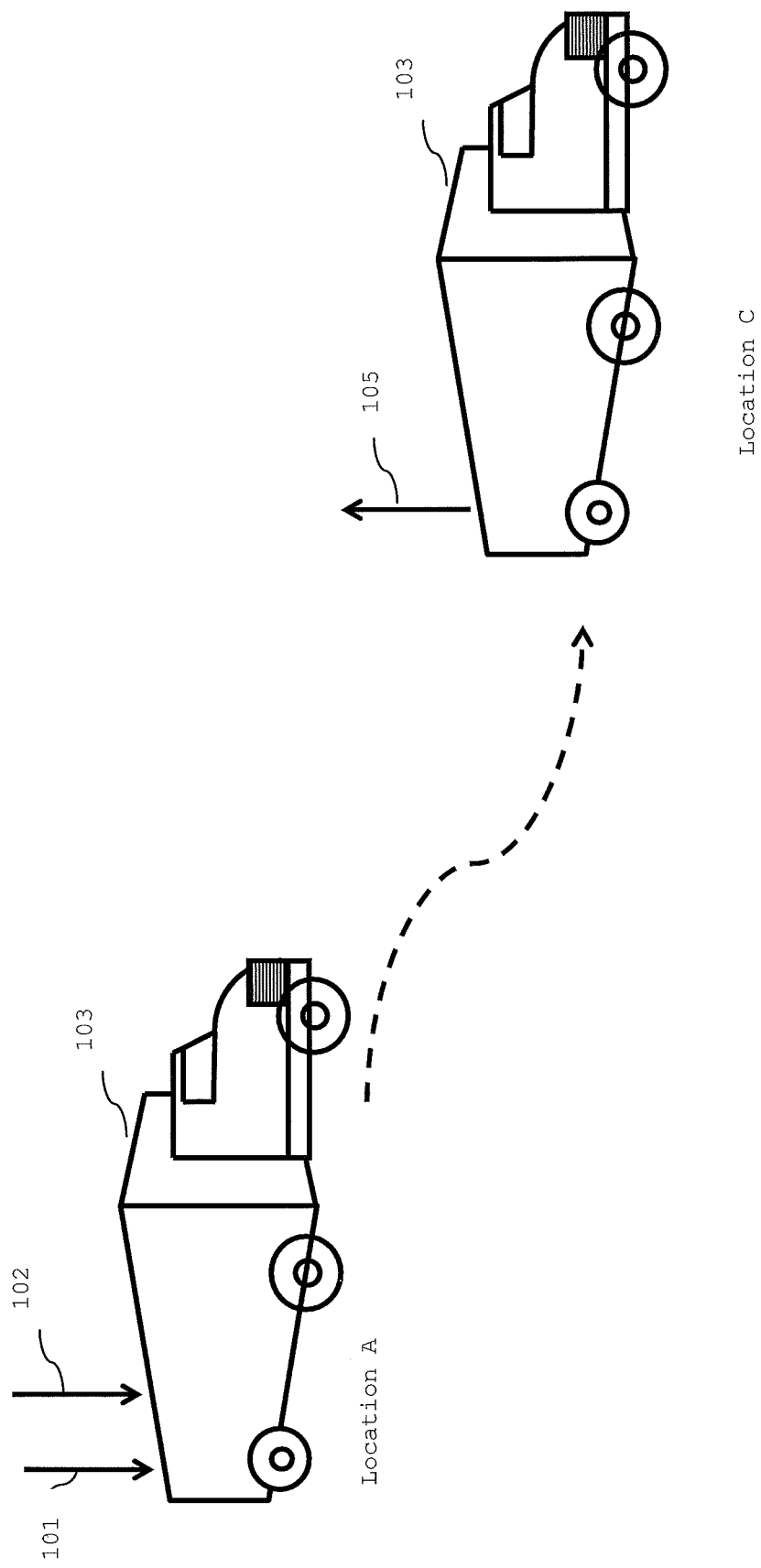

US 11,267,705 B2

PROCESS FOR REDUCING THE HYDROGEN SULPHIDE CONTENT IN NON-GASEOUS SULPHUR COMPOSITIONS USING A ZINC-BASED SCAVENGER

PRIORITY CLAIM

The present application is the National Stage (§ 371) of International Application No. PCT/EP2017/068408, filed Jul. 20, 2017, which claims priority from IN Application 201641025093, filed Jul. 22, 2016 incorporated herein by reference.

FIELD OF THE INVENTION

This invention relates to a process for reducing the hydrogen sulphide content in a composition containing hydrogen sulphide and non-gaseous elemental sulphur.

BACKGROUND OF THE INVENTION

Sulphur is a by-product in many different industries. Sulphur is for example produced in oil refineries and natural gas plants, for example when desulphurizing oils or natural gas. Another example is the Canadian oil sands. Many crude oils derived from such Canadian oil sands contain elemental sulphur or sulphur compounds. When upgrading these crude oils to a more easily marketable product, substantial amounts of elemental sulphur are produced.

The safe handling, transport, storage or conversion of molten or otherwise liquid sulphur is often complicated by the presence of hydrogen sulphide ($H_2S$). The problem of reducing the amount of hydrogen sulphide in molten sulphur has been solved in many different ways.

Conventionally hydrogen sulphide is removed from sulphur by means of a catalytic degassing process. Such catalytic degassing process requires specific equipment and requires expensive catalysts.

U.S. Pat. No. 6,656,445 mentions that hydrogen sulphide present in molten sulphur can be a safety and odor problem. It describes that this problem may for example occur at a refinery in storage pits or tanks or in vessels such as rail cars and tank trucks, which transport the sulphur. U.S. Pat. No. 6,656,445 describes a method for inhibiting the evolution of hydrogen sulphide from molten sulphur comprising contacting molten sulphur contaminated with at least one sulfhydryl compound with an effective amount of a scavenging agent selected from the group consisting of anhydrides and polymers thereof, conjugated ketones, carbonates, monoesters and diesters of unsaturated dicarboxylic acids and polymers of these esters, where the scavenging agent is in liquid form at contact temperature. In the examples of U.S. Pat. No. 6,656,445 a number of potential scavenging agents were screened, including a zinc naphthenate. Table 1 of U.S. Pat. No. 6,656,445 illustrates that the use of such zinc naphthenate as a scavenging agent did not appear to give any improvement over the blank experiment using no additive. It was concluded that the metal additives were hard to deliver and that copper additive turned the sulphur to a dark colour.

In their article titled "Sulphide Scavengers in Oil and Gas Industry—A Review", published in 2010 in NAFTA, vol 61, pages 85 to 92, M. K. Amosa et al. give an overview of the efforts which have been put forth so far in the industry to minimize or eliminate the various problems caused by hydrogen sulphide during oil and gas drilling operations by the use of some chemicals. The advantages and disadvantages of using the various chemicals for scavenging hydrogen sulphide drilling fluids and produced fluids are compared. The article mentions that the only safe method for the total removal of hydrogen sulphide or soluble sulphides is with a sulphide scavenger. It is, however, noted in the article that several hydrogen sulphide scavengers are being employed in the oil and gas industry and that "the type of scavenger needed for a specific field application depends". According to the article, as an alternative to other mentioned scavengers, zinc-containing chemicals and zinc oxide (ZnO), zinc carbonate ($ZnCO_3$), and basic zinc carbonate ($Zn_5(OH)_6(CO_3)_2$) are used in drilling operations to scavenge hydrogen sulphide. However, according to the article, zinc-based chemicals cause detrimental effects to mud rheology, especially flocculation, and causes fluid loss.

Although, in passing, the article mentions that hydrogen sulphide can be found as a component dissolved in even liquid sulphur, the article does not provide any guidance if and how hydrogen sulphide could be removed from such liquid sulphur.

It would be an advancement in the art to provide a simple and economically attractive process suitable for decreasing or reducing hydrogen sulphide content in a composition containing hydrogen sulphide and liquid elemental sulphur.

SUMMARY OF THE INVENTION

Such advancement has been achieved with the process according to the invention.

Accordingly, the present invention provides a process for reducing the hydrogen sulphide content in a composition containing hydrogen sulphide and non-gaseous elemental sulphur, comprising contacting the composition with a scavenger, wherein the scavenger is chosen from the group consisting of zinc oxide, zinc carbonate, zinc hydroxy carbonate or a combination of two or more of these.

As illustrated in the examples, the process according to the invention is suitable for decreasing or reducing the hydrogen sulphide content of a composition containing hydrogen sulphide and non-gaseous elemental sulphur.

Without wishing to be bound by any kind of theory it is believed that the hydrogen sulphide may be converted to other compounds, such as for example zinc sulphide. Zinc sulphide is believed to create less safety and odor problems.

The process according to the invention is simple and cheap and advantageously allows one to partly or even completely remove hydrogen sulphide from a composition containing hydrogen sulphide and non-gaseous elemental sulphur. In addition the process according to the invention contributes to the safe handling, transport, storage or conversion of non-gaseous elemental sulphur, such as for example molten or otherwise liquid sulphur.

BRIEF DESCRIPTION OF THE FIGURES

FIG. 1 schematically illustrates an example of a process according to the invention.

DETAILED DESCRIPTION OF THE INVENTION

By the word "comprising", and respectively "comprise", is herein understood "including", and respectively "include".

By non-gaseous elemental sulphur is herein understood elemental sulphur that is in a liquid or solid state as opposed to a gaseous state. By elemental sulphur is herein understood sulphur that is present in its elemental form as opposed to sulphur that is chemically bound to a hydrocarbon compound. The non-gaseous elemental sulphur can be solid elemental sulphur or liquid elemental sulphur. Without wishing to be bound by any kind of theory it is believed that the invention works best when the non-gaseous elemental sulphur is liquid elemental sulphur. In the embodiments of this invention, the non-gaseous elemental sulphur is preferably liquid elemental sulphur. Such liquid elemental sulphur may herein also be referred to as simply "liquid sulphur".

The composition containing hydrogen sulphide and non-gaseous elemental sulphur present at the start of the process may herein also be referred to as "feed composition". This composition preferably contains equal to or more than 50.000 weight percent (wt. %), more preferably equal to or more than 70.000 wt. %, still more preferably equal to or more than 80.000 wt. %, even more preferably equal to or more than 90.000 wt. %, more preferably equal to or more than 95.000 wt. %, even still more preferably equal to or more than 99.000 wt. % of liquid sulphur and most preferably equal to or more than 99.900 wt. %, based on the total weight of the composition. There is no maximum weight percentage for the amount of liquid sulphur in the composition, but in practice the composition will preferably contain less than 100.000 wt. %, more preferably equal to or less than 99.999 wt. %, even more preferably equal to or less than 99.998 wt. % and still more preferably equal to or less than 99.997 wt. % of liquid sulphur, based on the total weight of the composition. It is also possible for the composition to contain equal to or less than 99.990 wt. % of liquid sulphur based on the total weight of the composition. Most preferably the composition contains equal to or more than 99.000 wt. % and equal to or less than 99.997 wt. % of liquid sulphur, based on the total weight of the composition.

In addition, the composition preferably contains equal to or more than 2 parts per million weight (ppmw), more preferably equal to or more than 0.001 wt. %, even more preferably equal to or more than 0.002 wt. % and still more preferably equal to or more than 0.003 wt. % of hydrogen sulphide, based on the total weight of the composition. There is no maximum weight percentage for the amount of hydrogen sulphide in the composition, but in practice the composition will preferably contain less than 1.000 wt. %, more preferably equal to or less than 0.500 wt. %, even more preferably equal to or less than 0.100 wt. %, still more preferably equal to or less than 0.050 wt. % and even more preferably equal to or less than 0.030 wt. % of hydrogen sulphide, based on the total weight of the composition. It is also possible for the composition to contain equal to or less than 0.010 wt. % of hydrogen sulphide based on the total weight of the composition.

For example, the composition can contain equal to or more than 99.000 wt. % and equal to or less than 99.999 wt. % of liquid sulphur and equal to or more than 10 ppmw (corresponding to 0.001 wt %) and equal to or less than 10000 ppmw (corresponding to 1 wt %) of hydrogen sulphide, based on the total weight of the composition. For any remaining part the composition may contain other compounds (such as for example water, hydrocarbons, inorganic minerals and/or ash) such that the total weight of the total composition is 100.000 wt %.

Although it is possible for the composition to contain other compounds in addition to the liquid sulphur and the hydrogen sulphide, the composition can also essentially or completely consist of only liquid sulphur and hydrogen sulphide. When the composition essentially or completely consists of liquid sulphur and hydrogen sulphide, the composition preferably contains equal to or more than 2 ppmw, more preferably equal to or more than 5 ppmw, still more preferably equal to or more than 10 ppmw, even more preferably equal to or more than 15 ppmw, still even more preferably equal to or more than 20 ppmw or even equal to or more than 30 ppmw and most preferably equal to or more than 50 ppmw of hydrogen sulphide, based on the total weight of the composition, and equal to or less than 10000 ppmw, more preferably equal to or less than 5000 ppmw, even more preferably equal to or less than 1000 ppmw, still even more preferably equal to or less than 500 ppmw and most preferably equal to or less than 300 ppmw of hydrogen sulphide, based on the total weight of the composition, with the remainder being liquid sulphur such that the total weight of the total composition is 100.000 wt %.

More preferably the invention provides a process including the step of contacting a composition containing or consisting of hydrogen sulphide and non-gaseous elemental sulphur with one or more scavenger(s), wherein the composition preferably contains more than 10 ppmw hydrogen sulphide and less than 10000 ppmw hydrogen sulphide based on the total weight of the composition, and wherein the one or more scavenger(s) are chosen from the group consisting of zinc carbonate, zinc hydroxy carbonate and mixtures thereof. As mentioned above, with such a process the hydrogen sulphide content of the composition can advantageously be decreased. The process according to the invention may conveniently result in a product composition having a decreased hydrogen sulphide content as compared to the composition. All preferences mentioned herein also apply to this preferred process.

The scavenger may herein also be referred to as hydrogen sulphide scavenger. By a scavenger is herein preferably understood a compound that is capable of chemically or physically removing an undesirable component, such as for example hydrogen sulphide, from a composition. The undesirable compound may for example be removed through deactivation, chemical or physical conversion or another suitable chemical or physical manner. The scavenger can be a zinc oxide (ZnO), zinc carbonate ($ZnCO_3$), a zinc hydroxy carbonate (such as $Zn_5(OH)_6(CO_3)_2$) or a combination of these. Most preferably the scavenger is a zinc hydroxy carbonate (such as $Zn_5(OH)_6(CO_3)_2$). Such zinc hydroxy carbonate can be present in a non-hydrated form as a dehydrated zinc hydroxy carbonate or in a hydrate form as a zinc hydroxy carbonate hydrate ($Zn_5(OH)_6(CO_3)_2.xH_2O$). If the scavenger is a zinc hydroxy carbonate, the zinc hydroxy carbonate scavenger preferably has a particle size in the range from 0.1 to 150 microns, more preferably in the range from 30 to 70 microns and most preferably in the range from 40 to 60 microns.

Furthermore any zinc hydroxy carbonate scavenger may preferably have a BET surface area in the range from 20 to 70 $m^2/g$, more preferably in the range from 30 to 60 $m^2/g$.

The one or more scavengers(s) is/are preferably contacted with the composition containing or consisting of liquid sulphur and hydrogen sulphide (also referred to as the "feed composition") in an amount of equal to or more than 0.005 wt. %, even more preferably equal to or more than 0.010 wt. % and still more preferably equal to or more than 0.015 wt. % based on the total weight of the (feed) composition. In practice the scavenger(s) is/are further preferably used at an amount of equal to or less than 0.5 wt. % even still more preferably equal to or less than 0.2 wt. % and most preferably equal to or less than 0.1 wt % based on the total weight of the composition.

The weight ratio of scavenger(s) to hydrogen sulphide is preferably equal to or more than 0.1:1 and preferably equal to or less than 100:1, more preferably the weight ratio of scavenger(s) to hydrogen sulphide lies in the range from equal to or more than 0.5:1 to equal to or less than 10:1.

Hence preferably the invention provides a process including the step of contacting a composition containing or consisting of hydrogen sulphide and non-gaseous elemental sulphur with one or more scavenger(s), wherein the composition preferably contains more than 10 ppmw hydrogen sulphide and less than 10000 ppmw hydrogen sulphide based on the total weight of the composition, and wherein the one or more scavenger(s) are chosen from the group consisting of zinc carbonate, zinc hydroxy carbonate and mixtures thereof, and wherein the scavenger is contacted with the composition in an amount of equal to or more than 0.005 wt. % and equal to or less 0.5 wt % of scavengers(s) based on the total weight of the composition.

The scavenger(s) can be contacted with the composition in any possible manner.

For example, the process can comprise a step comprising mixing the scavenger and a composition containing hydrogen sulphide and solid elemental sulphur to form a mixture containing hydrogen sulphide, solid elemental sulphur and scavenger and a subsequent step comprising melting the mixture containing hydrogen sulphide, solid elemental sulphur and scavenger to form a mixture containing hydrogen sulphide, liquid elemental sulphur and scavenger. The last step conveniently allows a contact between liquid elemental sulphur and the scavenger.

It is also possible for the process to comprise a step comprising melting a composition containing hydrogen sulphide and solid elemental sulphur to form a composition containing hydrogen sulphide and liquid elemental sulphur and a subsequent step comprising mixing the scavenger and the composition containing hydrogen sulphide and liquid elemental sulphur to form a mixture containing hydrogen sulphide, liquid elemental sulphur and scavenger.

The scavenger can also be deposited on a solid carrier, whereafter the composition is contacted with the scavenger as deposited on such a solid carrier. The solid carrier with the deposited scavenger may advantageously be present as a filter. Hence, advantageously the invention provides a process for reducing the hydrogen sulphide content in a composition containing or consisting of hydrogen sulphide and non-gaseous elemental sulphur, comprising filtering the composition over a filter, wherein the filter comprises a scavenger deposited on a solid carrier and the scavenger is chosen from the group consisting of zinc oxide, zinc carbonate, zinc hydroxy carbonate or a combination of two or more of these.

Preferably, however, the scavenger and the composition are at least partly mixed with each other. The scavenger(s) and the composition can be combined in any manner suitable therefore. For example, the scavenger can be added to the composition or the composition can be added to the scavenger. It is also possible for the scavenger and the composition to be simultaneously added to a vessel, container or other suitable holder. Most preferably, the composition is added to the scavenger(s).

After combining, the scavenger(s) and composition can be stirred, shaken or otherwise mixed. The mixing may be carried out in dedicated mixing equipment such as for example a static mixer, a paddle or impeller. After combining the feed composition to a vessel, container or other holder, the composition and scavenger are preferably stirred, shaken or otherwise mixed. The temperature at which the scavenger(s) are contacted with the composition may vary widely.

For example, it is possible to combine the scavenger(s) with a composition at a temperature where the composition is in a solid form and to subsequently convert the combination of scavenger(s) and composition into a liquid by heating. Alternatively a composition can be first melted into a liquid composition, whereafter the scavenger(s) are combined with the liquid composition.

Preferably the temperature at which the scavenger(s) are combined with the composition lies in the range from equal to or more than 120° C. to equal to or less than 160° C., more preferably in the range from equal to or more than 125° C. to equal to or less than 150° C.

The pressure at which the scavenger(s) are contacted with the composition may vary widely. Preferably the pressure at which the scavenger(s) are combined with the composition at a pressure of about 1 bar absolute (corresponding to about 0.1 MegaPascal).

It is further possible to combine the scavenger and the composition, subsequently mixing the composition and the scavenger and subsequently filtering out any precipitated zinc salt that forms; this may possibly be a zinc sulphide salt. This allows one to permanently remove the hydrogen sulphide from the composition.

The process according to the invention can be carried out batch-wise, semi-batch-wise or continuously.

When carried out as a batch-wise process or semi-batch-wise, the composition and scavenger are preferably stirred, shaken, otherwise mixed or contacted with each other for a period of equal to or more than 10 minutes, more preferably equal to or more than 30 minutes and still more preferably for a period of equal to or more than 1 hour. There is no maximum to the amount of time that the stirring, shaking or otherwise mixing or contacting can take, but in practice stirring, shaking or otherwise mixing or contacting would not need to take longer than equal to or less than 20 hours, more preferably equal to or less than 15 hours and still more preferably equal to or less than 10 hours.

When the process is carried out as a batch-wise process, the composition and the scavenger(s) can be stirred, shaken or otherwise mixed in any type of vessel, container or other holder. It is, however, especially preferred to stir, shake or otherwise mix or contact the composition and the scavenger(s) during transport from a first location to a second location. For example, the composition and the scavenger could be loaded together in a truck or train container, whereafter stirring, shaking or otherwise mixing or contacting would occur automatically during transport, for example by the mere agitation associated with the driving or transport. As illustrated by the examples it has been surprisingly found that the stirring, shaking and or otherwise mixing or contacting occurring automatically during such transport is sufficient for the reaction between hydrogen sulphur and the scavenger to occur. Surprisingly it was found that no sophisticated equipment was needed to carry out the process according to the invention and that by allowing the scavenger and the composition to be contacted during such transport, sufficient stirring, shaking or otherwise mixing or contacting could be achieved. This allows one to achieve very attractive time and cost savings.

Without wishing to be bound to any kind of theory it is believed that by contacting the composition with the scavenger, the hydrogen sulphide reacts with the scavenger and that e.g. zinc sulphide and one or more other compounds are formed. Surprisingly it has been found that such reaction does not require sophisticated equipment, but can be allowed to occur just during transport, for example in a truck or train container.

The process according to the invention allows for a product composition to be formed. Advantageously, the process according to the invention allows for a product composition containing a reduced amount of hydrogen sulphide. The product composition preferably contains equal to or less than 10 wt. % of the hydrogen sulphide originally present in the composition, more preferably equal to or less than 1 wt. % of the hydrogen sulphide originally present in the composition. Most preferably such product composition contains essentially no hydrogen sulphide anymore. Without wishing to be bound to any kind of theory, it is believed that the product composition can contain liquid sulphur, optionally any residual scavenger and zinc salt(s), for example zinc sulphide. Advantageously formed zinc sulphide can be removed, for example by filtering. This may advantageously allow one to produce a product composition containing or essentially consisting of solely liquid elemental sulphur.

The above mentioned product composition may conveniently be used as a feedstock for a so-called forming or handling process where the liquid sulphur is solidified into solid sulphur. It is, however, also possible to use the product composition as a feedstock for or in the production of other sulphur containing products.

The invention is illustrated by the following non-limiting FIGURE.

In FIG. 1 a zinc hydroxy carbonate scavenger (101) is added to the bottom of a trailer of a truck (103) at a location A. Subsequently a composition (102) containing liquid elemental sulphur and hydrogen sulphide is added on top of the zinc hydroxy carbonate scavenger (101) at location A or optionally a location B (only location A is shown). Hereafter truck (103) drives in 6 hours from location A or B to a location C. As a consequence of the agitation associated with the driving, the zinc hydroxy carbonate scavenger (101) and composition (102) are mixed. At location C a product composition (105) containing liquid elemental sulphur and zinc sulphide is unloaded from the trailer of truck (103), such a product composition (105) containing less hydrogen sulphide than composition (102).

The invention is further illustrated by the following non-limiting examples.

Comparative Example A and Examples 1 to 3

Comparative example A and examples 1 to 3 were carried out to determine the effect of adding zinc hydroxy carbonate scavenger to molten elemental sulphur containing hydrogen sulphide. Aluminium tubes with a height of 160 mm, diameter of 25 mm and one end closed off were used in the study. Appropriate amounts of zinc hydroxy carbonate scavenger (with a particle size varying from 40 to 60 microns and a BET surface area of about 45 $m^2/g$) were added to tubes such that with 100 g of elemental sulphur the concentration of the scavenger amounted to 0.02, 0.05 and 0.1%. 100 g molten elemental sulphur was then added to the tube, the end of the tube closed off by sealing the end of the tubes. The tubes were then inverted with the sealed end at the bottom and maintained, without agitation, at 130° C. for 36 hours. The concentration of hydrogen sulphide ($H_2S$) in the headspace of the tubes at the start of the experiment and after 36 hours was measured. The results showed that the addition of zinc hydroxy carbonate scavenger to the elemental sulphur containing hydrogen sulphide resulted in a reduction in hydrogen sulphide concentration in the headspace, (see examples 1, 2 and 3 in Table 1). A comparative example A without the addition of the zinc hydroxy carbonate scavenger was also carried out. The residual hydrogen sulphide content in the molten sulphur was also measured by decanting the supernatant molten sulphur and following the protocol as described by K. L. Lesage, and P. D. Clarke, "A field method for the determination of total $H_2S$ content in commercially formed elemental sulphur", ASRL Quarterly Bulletin, vol. 29 (1), pages 29-35, (1992), with the exception that Drager tubes were used instead of Kitigawa tubes.

TABLE 1

Effect of $H_2S$ scavenger in a closed tube containing molten elemental sulphur (all wt. % and ppmw's based on the weight of the total feed composition of elemental sulphur and hydrogen sulphide)

| Example | Composition | Concentration of $H_2S$ in the headspace at T = 0 (ppmw) | Concentration of $H_2S$ in the headspace at T = 36 hrs (ppmw) | Concentration of $H_2S$ in the molten sulphur at T = 36 hrs (ppmw) |
|---|---|---|---|---|
| A* | Liquid elemental sulphur without zinc hydroxy carbonate scavenger | 0 | 67000 | 2600 |
| 1 | Liquid elemental sulphur with 0.02 wt. % zinc hydroxy carbonate scavenger | 0 | 50000 | 2600 |
| 2 | Liquid elemental sulphur with 0.05 wt. % zinc hydroxy carbonate scavenger | 0 | 37000 | Not determined |
| 3 | Liquid elemental sulphur with 0.1 wt. % zinc hydroxy carbonate scavenger | 0 | 2300 | 200 |

* Comparative example

Examples 4 and 5

In examples 4 and 5, the scavenger and the composition containing hydrogen sulphide and liquid elemental sulphur were directly loaded into the trailer of a truck and mixed by means of the agitation associated with the driving of such a truck.

In each example one truck was used, each truck having two separate trailers, a front trailer and a rear trailer.

In each example the front trailer (as summarized under 4a and 5a in Table 2) was first loaded with a composition containing hydrogen sulphide and liquid elemental sulphur, whereafter subsequently a zinc hydroxy carbonate scavenger was added on top of such composition in an amount as summarized in Table 2.

The rear trailer in each example (as summarized under 4b and 4b in Table 2) was first loaded with zinc hydroxy carbonate scavenger at the bottom of the trailer in an amount as summarized in Table 2, whereafter subsequently a composition containing hydrogen sulphide ($H_2S$) and liquid elemental sulphur was added on top of such scavenger.

Surprisingly it was found that the decrease in hydrogen sulphide content was larger for the rear trailer, where the zinc hydroxy carbonate scavenger was loaded first at the bottom of the trailer and the composition was added on top of such scavenger.

TABLE 2

Examples 4 and 5 (all wt. % and ppmw's based on the weight of the total feed composition of elemental sulphur and hydrogen sulphide)

| | Amount of $Zn(OH)CO_3$ scavenger (in wt. %) | $H_2S$ content at t = 0 (ppmw) | Trucking Time (min) | Residual $H_2S$ content after trucking time (ppmw) |
|---|---|---|---|---|
| 9a (front trailer) * | 0.01 | 22.8 | 280 | 2.5 |
| 9b (rear trailer) ** | 0.01 | 22.8 | 270 | 2.3 |
| 10a (front trailer) * | 0.01 | 26.6 | 166 | 16.1 |
| 10b (rear trailer) ** | 0.01 | 26.6 | 176 | 11.9 |

* front trailer, scavenger added on top of composition containing hydrogen sulphide and liquid elemental sulphur
** rear trailer, scavenger added on the bottom of the trailer and composition containing hydrogen sulphide and liquid elemental sulphur added on top of scavenger.

That which is claimed is:

1. A process for reducing the hydrogen sulphide content in a composition containing hydrogen sulphide and non-gaseous elemental sulphur, comprising contacting the composition with a scavenger, wherein the scavenger is chosen from the group consisting of zinc oxide, zinc carbonate, zinc hydroxy carbonate or a combination of two or more of these.

2. The process including the step of contacting a composition containing or consisting of hydrogen sulphide and non-gaseous elemental sulphur with one or more scavenger(s), wherein the composition contains more than 10 ppmw and less than 10000 ppmw hydrogen sulphide based on the total weight of the composition, and wherein the one or more scavenger(s) are chosen from the group consisting of zinc carbonate, zinc hydroxy carbonate and mixtures thereof.

3. The process according to claim 1, wherein the composition containing or consisting of hydrogen sulphide and non-gaseous elemental sulphur is a composition containing or consisting of hydrogen sulphide and liquid elemental sulphur.

4. The process according to claim 3, wherein the composition contains between equal to or more than 99.000 wt. % and equal to or less than 99.999 wt. % of liquid elemental sulphur and between equal to or more than 10 ppmw and equal to or less than 10000 ppmw of hydrogen sulphide, based on the total weight of the composition.

5. The process according to claim 1, wherein the scavenger is a zinc hydroxy carbonate.

6. The process according to claim 1, wherein the scavenger is contacted with the composition in an amount of equal to or more than 0.005 wt. % and equal to or less than 0.5 wt. % scavenger based on the total weight of the composition.

7. The process according to claim 1, wherein the weight ratio of the scavenger to hydrogen sulphide is equal to or more than 0.01 to 1 (0.01:1) and equal to or less than 100 to 1 (100:1).

8. The process according to claim 1, wherein the process comprises:
   a step comprising mixing the scavenger and a composition containing hydrogen sulphide and solid elemental sulphur to form a mixture containing hydrogen sulphide, solid elemental sulphur and scavenger;
   a subsequent step comprising melting the mixture containing hydrogen sulphide, solid elemental sulphur and scavenger to form a mixture containing hydrogen sulphide, liquid elemental sulphur and scavenger.

9. The process according to claim 1, wherein the process comprises:
   a step comprising melting a composition containing hydrogen sulphide and solid elemental sulphur to form a composition containing hydrogen sulphide and liquid elemental sulphur; and
   a subsequent step comprising mixing the scavenger and the composition containing hydrogen sulphide and liquid elemental sulphur to form a mixture containing hydrogen sulphide, liquid elemental sulphur and scavenger.

10. The process according to claim 1, wherein the scavenger is deposited on a solid carrier.

11. The process according to claim 1, wherein the composition containing or consisting of hydrogen sulphide and non-gaseous elemental sulphur is added to the scavenger and the composition and scavenger are mixed.

12. The process according to claim 1, wherein the process is a batch-wise or semi-batchwise process and the scavenger is mixed with the composition by means of the agitation associated with transport from a first location to a second location.

13. The process according to claim 1, thereby forming a product composition.

14. The process according to claim 13, wherein the product composition is directly or indirectly at least partly solidified into solid elemental sulphur.

15. The mixture comprising non-gaseous elemental sulphur and zinc hydroxy carbonate.

* * * * *